(12) United States Patent
Fellhauer et al.

(10) Patent No.: US 6,726,245 B2
(45) Date of Patent: Apr. 27, 2004

(54) GAS BAG MODULE

(75) Inventors: Joachim Fellhauer, Niikheim (DE); Stefan Bohn, Goldbach (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 10/068,379

(22) Filed: Feb. 6, 2002

(65) Prior Publication Data

US 2002/0105171 A1 Aug. 8, 2002

(30) Foreign Application Priority Data

Feb. 7, 2001 (DE) ..................... 201 02 115 U

(51) Int. Cl.$^7$ ............................... B60R 21/16
(52) U.S. Cl. .................. 280/743.2; 280/728.2
(58) Field of Search ............... 280/728.2, 729, 280/730.1, 731, 743.1, 743.2, 732

(56) References Cited

U.S. PATENT DOCUMENTS

| 5,669,632 A | * | 9/1997 | Johnson et al. | .......... 280/743.2 |
| 5,730,464 A | * | 3/1998 | Hill | .......... 280/743.2 |
| 5,931,497 A | | 8/1999 | Fischer | |
| 6,042,147 A | * | 3/2000 | Nishijima et al. | ....... 280/743.1 |
| 6,254,121 B1 | * | 7/2001 | Fowler et al. | ............ 280/729 |
| 6,536,801 B2 | * | 3/2003 | Frisch | .................... 280/743.2 |

FOREIGN PATENT DOCUMENTS

DE 3833889 A1 4/1990

* cited by examiner

*Primary Examiner*—Paul N. Dickson
*Assistant Examiner*—David R. Dunn
(74) *Attorney, Agent, or Firm*—Tarolli, Sundheim, Covell & Tummino L.L.P.

(57) ABSTRACT

The invention relates to a gas bag module comprising a gas bag with a gas bag wall which has a front and a rear wall section. A depression is provided which has a mouth and runs in an inflated state of the gas bag from the front wall section to the rear wall section, which depression is formed in that a part of the gas bag wall is prevented from an unimpeded movement away from the module on unfolding of the gas bag. The module further comprises at least one closure piece which is fastened to the gas bag wall such that in the inflated state it moves in front of the mouth of the depression and closes the depression.

14 Claims, 2 Drawing Sheets

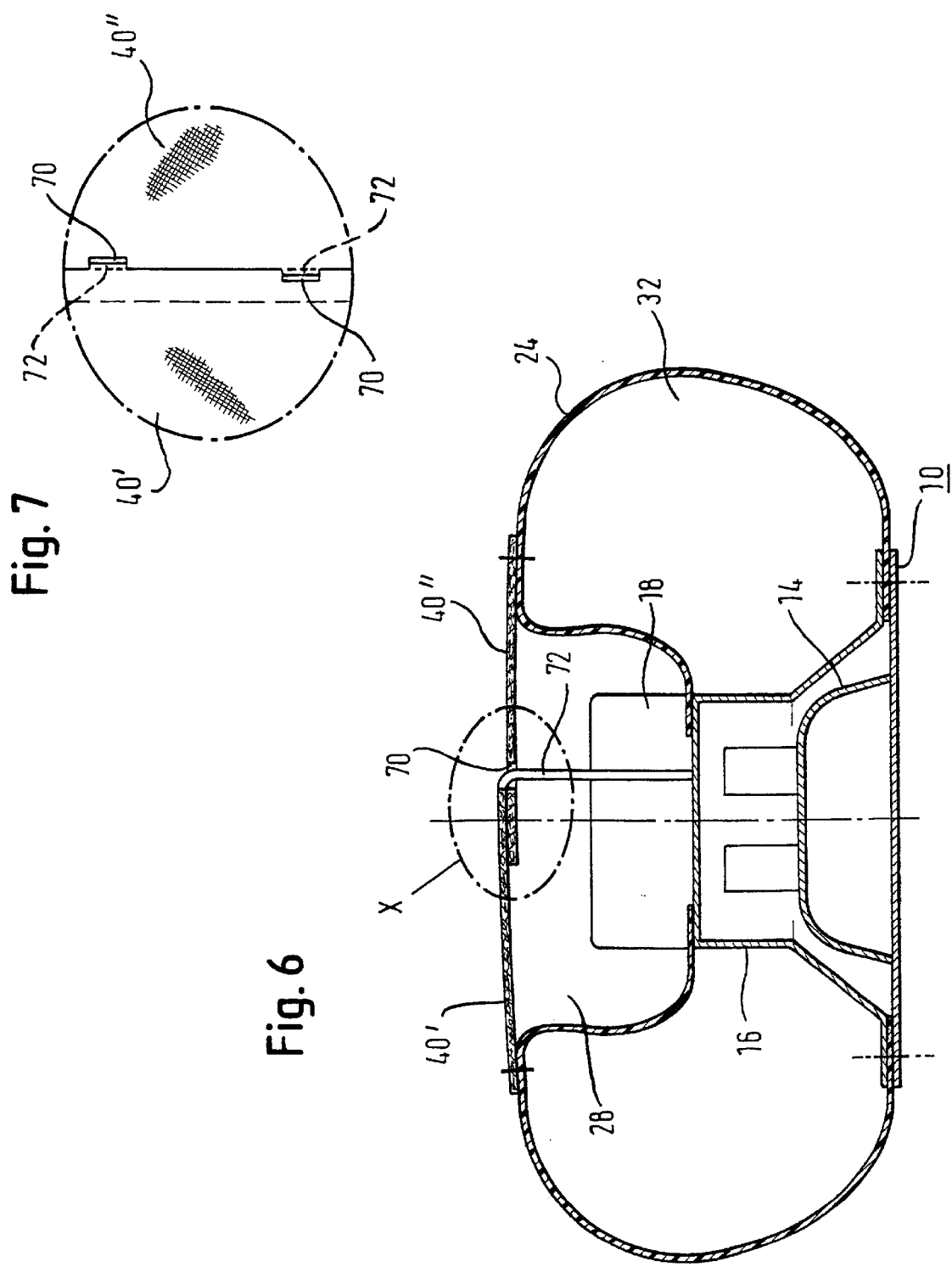

GAS BAG MODULE

TECHNICAL FIELD

The present invention relates to a gas bag module.

BACKGROUND OF THE INVENTION

Known gas bag modules comprise a gas bag with a gas bag wall which has a front and a rear wall section, a depression including a mouth and running in the inflated state from the front wall section to the rear wall section. The depression is formed in that a part of the gas bag wall is prevented from an unimpeded movement away from the module on unfolding. Such gas bags are intended to be incorporated in the steering wheel or the instrument panel and to protect the occupant during a frontal impact. The gas bag has an annular chamber which is to be inflated, the inner wall, delimiting the depression, being formed by the depression. The depression extends from the front wall centrally towards the rear, and the lowest point of the depression is formed by a fabric piece which is permanently fastened to the gas bag module and hence on unfolding is not moved towards the occupant. Furthermore, the gas bag usually emerges obliquely outwards from the module owing to the annular shape of the chamber, and only subsequently does the front wall section move in the direction toward the occupant.

With an occupant sitting centrally and in the presence of a high impact intensity, it must be prevented that the occupant's head can plunge into the depression.

BRIEF SUMMARY OF THE INVENTION

The invention provides a gas bag module in which the gas bag even with an occupant sitting centrally and with a high impact intensity achieves excellent restraint values. This is achieved in a gas bag module which comprises a gas bag with a gas bag wall which has a front and a rear wall section. A depression is provided which has a mouth and runs in an inflated state of the gas bag from the front wall section to the rear wall section, which depression is formed in that a part of the gas bag wall is prevented from an unimpeded movement away from the module on unfolding of the gas bag. The module further comprises at least one closure piece which is fastened to the gas bag wall such that in the inflated state it moves in front of the mouth of the depression and closes the depression. The mouth of the depression is the transition of the front wall section to the depression, i.e. the inlet thereof. The closure part moves in front of this inlet, so that at the end of the inflation process a closed wall, without accessible depression, is available to restrain the occupant. The depression is not a chamber to be filled by the gas of the gas generator and is not in flow connection with the gas generator.

According to one embodiment, the closure piece is a fabric piece which is sewn to the gas bag wall.

This closure piece can be constructed in a band shape, the two ends of the band being able to be fastened to the rear wall section, and the band running across the front wall section. The band is simple to fasten, is flexible and does not represent a projecting part. The displacement of the band takes place by the front and rear wall sections moving relative to each other, without a device, to be actuated separately, being required for the displacement of the band.

A closure piece constructed in a cross shape, which is fastened by the free ends on the rear wall section, also offers similar advantages. The crossing point then closes the depression. Through the cross-shaped form, a higher stability of the closure piece is produced compared with the embodiment with a band-shaped closure piece.

Another design makes provision that at least two closure pieces are provided. These closure pieces are preferably connected with each other, the connection allowing a relative movement of both closure pieces with respect to each other. This has the advantage that in the folded state they can be laid around a central holding piece which will be explained in further detail below. In the unfolded state, the two closure pieces, which preferably overlap each other, safely close the depression and fix each other in their relative position.

One closure piece may, for example, have at least one leadthrough opening for the other closure piece, the latter extending right through the leadthrough opening and preferably as far as into the depression.

In this arrangement, a band-shaped prolongation of one closure piece may extend through the leadthrough opening and as far as to a central holding piece to which also the one part of the gas bag wall is fastened that is prevented from an unhindered movement towards outside of said module. The band-shaped prolongation fastened to the holding piece acts as a limiting strap here.

The, for instance, band-shaped or cross-shaped closure pieces can help also to replace the limiting straps which were usual hitherto, which delimit the movement of the front wall section and are intended to give the gas bag a defined shape. The holding back of the gas bag wall can in fact take place or be supported by the band-shaped or cross-shaped closure piece.

The gas bag is preferably housed in an annular chamber in the gas bag module which is defined on the inner face by a centrally arranged holding piece. This holding piece serves mostly to prevent a central piece of a covering of the module from moving outwards. The holding piece extends in the folded state of the gas bag inside the depression, with the depression moving along the holding piece on unfolding and leaving the module via an annular outlet opening. The closure piece, in the folded state, is placed around the holding piece and can then move on inflation such that it comes to lie in front of the depression.

Another embodiment makes provision that the closure piece has an opening through which, in the folded state, the holding piece extends. On unfolding, the opening moves, more precisely the edge of the opening, outwards along the holding piece. On inflation, the displacement of the closure piece then occurs relative to the gas bag wall, so that the opening is situated outside the depression in the fully inflated state. The embodiment with an opening has the advantage that the closure piece can be constructed as a fabric section having a large area and covering the entire front wall section like a second skin.

BRIEF DESCRIPTION OF THE DRAWINGS

FIG. 6 shows a longitudinal section through a forth embodiment of a gas bag module according to the invention, with the gas bag fully inflated, FIG. 7 shows a top view onto detail X of the gas bag shown in FIG. 6.

DETAILED DESCRIPTION OF THE PREFERRED EMBODIMENTS

Figure 1:
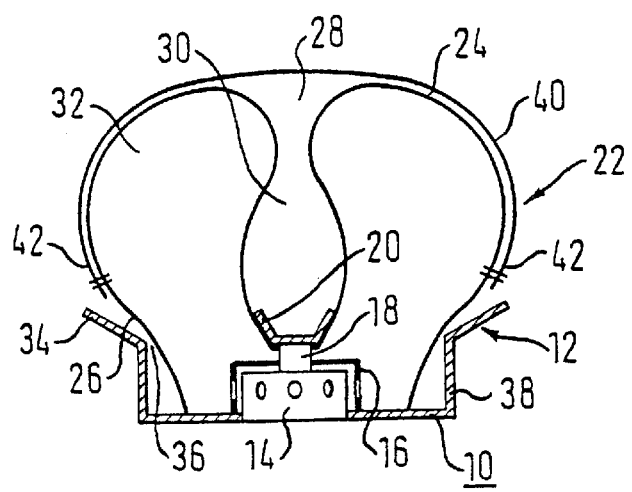
FIG. 1 shows a longitudinal section through a gas bag module according to the invention with fully inflated gas bag.

In FIG. 1 a gas bag module is illustrated, which is housed in the steering wheel of a vehicle. The gas bag module has an accommodation housing 10 which is closed on the front side with a covering 12. Housed in the module is a gas generator 14, which is surrounded by a cage-shaped diffusor 16. Projecting from the end face of the diffusor 16 is a holding piece in the form of a tube 18 which prevents a central piece 20 of the one-piece covering 12 from swinging outwards on opening of the covering 12, so that the central piece 20 remains. A gas bag 22 in the module has a gas bag wall which consists of several sections, namely a front wall section 24 which faces the occupant in the inflated state, and a rear wall section 26. The front wall section 24 has a central opening 28, which forms a mouth of a depression 30. The depression 30 is produced in that through the holding piece 18 and the central piece 20 a part of the gas bag wall, namely the actual center of the front wall section 24, is prevented from moving towards the occupant. Through the depression 30, which is not filled with gas, an annular chamber 32 of the gas bag 22 is produced, which is to be filled with gas.

Reference 34 designates the sections of the covering 12 which are severed from the central piece 20 on unfolding of the gas bag and swing outwards to free an annular outlet opening 36.

In the folded state, the gas bag is housed in the module in an annular space which is delimited radially by the cage 16, the holding piece 18 and externally by the peripheral wall 38 of the module housing 10.

So that the occupant, who bounces against the wall section 24, can not penetrate into the depression 30, the gas bag has a closure piece 40 in the form of a fabric strip or a fabric piece covering the entire wall section 24, which with its ends 42 is sewn externally on the gas bag wall, preferably on the rear wall section 26.

The closure piece 40 is illustrated spaced apart from the gas bag wall in FIG. 1 only for clarification. In fact, the closure piece 40 lies with its full surface against the gas bag wall.

The closure piece 40 must be fastened to the gas bag wall at such sites that in the inflated state, as illustrated, it moves in front of the mouth of the depression 30 and closes it. It is not absolutely necessary for the closure piece 40 to be fastened to the rear wall section 26; a fastening on the housing 10 of the module or on the front wall section 24 is also possible. However, the longer the closure piece is, the greater is the maximum displacement between the closure piece 40 and the mouth of the depression 30.

However, when the closure piece 40 in the form of a fabric band is fastened on the rear wall section 26 or even on the housing 10 of the module, it can fulfil an additional function, namely that of a conventional limiting strap which is arranged hitherto inside gas bags. As can be seen from FIG. 1, the gas bag of the module according to the invention preferably does not have a limiting strap arranged inside the chamber 32.

Figure 2:
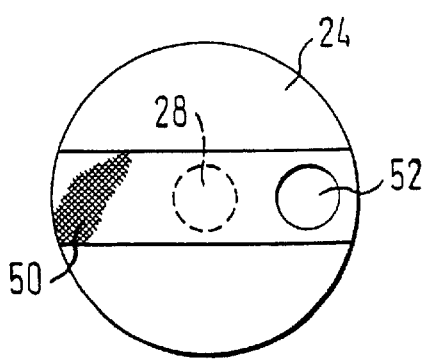
FIG. 2 shows a top view onto the front wall section of the gas bag in FIG. 1 in fully inflated state according to a first embodiment.

In FIG. 2 an embodiment of the closure piece 40 is illustrated, this being constructed as a fabric band 50. The fabric band 50, as illustrated in FIG. 1, is fastened to the rear wall section 26 and has an opening 52 which in the unfolded state lies outside the opening 28, i.e. outside the mouth of the depression 30. In the folded state, however, the opening 52 is constructed concentrically to the opening 28, so that the holding piece 18 can extend through the opening 52.

On unfolding, however, the opening 52 moves along the holding piece 18 and the central piece 20, in order to leave these. Then, however, the gas bag wall and the fabric band 50 move towards each other, so that the opening 52 travels outwards.

Figure 3:
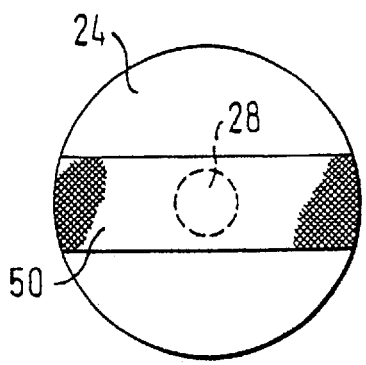
FIG. 3 shows a top view onto the front wall section with fully inflated gas bag according to a second embodiment.
Figure 4:
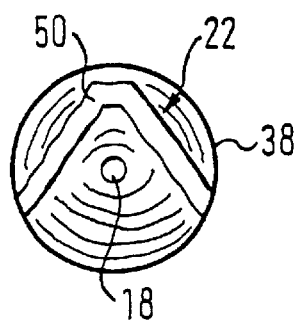
FIG. 4 shows a top view onto the gas bag module with folded gas bag, without covering.

In the embodiment according to FIG. 3, the fabric band 50 is constructed without the opening 52. In the folded state it is housed in the annular space between the holding piece 18 and the peripheral wall 38 such that it is placed around the holding piece 18. On installation, the gas bag 22 can be gathered up laterally, so that the fabric band 50 can be pushed to the side and the depression 30 is freed for the passage of the holding piece 18 (see FIG. 4). On unfolding, however, the fabric band 50 moves and closes the depression 30, as illustrated in FIG. 1.

Figure 5:
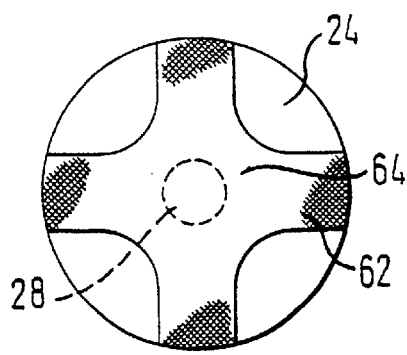
FIG. 5 shows a top view onto the front wall section of the inflated gas bag according to a third embodiment.

In the embodiment according to FIG. 5, the closure piece is a cross-shaped fabric piece 62, which closes the depression at its crossing point 64. In this embodiment, the four ends of the cross, as in FIG. 1, are attached to the rear wall section 26. Through this embodiment, the closure piece is given a high stability and can likewise serve as a limiting strap.

The embodiment according to FIGS. 6 and 7 corresponds essentially to those explained above; this is why only the differences will be considered and the already introduced reference numerals are adopted for parts having the same function.

Instead of one closure piece, there are provided in the embodiment according to FIG. 6 two closure pieces 40', 40" realized as fabric sections. Both closure pieces 40', 40" are attached to the front wall section 24 at a peripheral edge (by means of sewing, gluing, welding or the like). The closure piece 40" extends as far as to the center of the depression 28 and has, in the vicinity of the depression 28, several leadthrough openings 70 realized as elongated slots. In the region around the leadthrough openings 70, the fabric is reinforced so as to prevent a tearing out.

The closure piece 40' extends beyond the center of the depression 28, partially across the closure piece 40", in order to overlap it. At its right-hand end with respect to FIG. 6, the closure piece 40' has two band-shaped, long prolongations 72 by means of which it extends through the associated leadthrough openings 70 and into the depression 28. The prolongations 72 finally are attached to the holding piece 18. The prolongations 72 act as limiting straps, so that a limiting strap within the chamber 32 is no longer necessary. The provision of the several closure pieces results in a symmetric unfolding behavior of the gas bag and a safe closing procedure, because the closure pieces 40', 40" partially overlap, are tensioned and fixed relative to each other. The prolongations 72 may be embodied as a fabric section of the closure piece 40' or as straps attached thereto. The leadthrough openings 70 may be formed by loop-like, separate parts which are fastened to the closure piece 40".

Moreover, it is possible to use more than two closure pieces 40', 40". It is also possible that each closure piece has both leadthrough openings and prolongations that protrude through leadthrough openings of an adjacent closure piece, i.e. the upper leadthrough opening 70, with respect to FIG. 7, is provided at the closure piece 40" whereas the lower leadthrough opening 70 is provided at the closure piece 40'.

Figure 8:
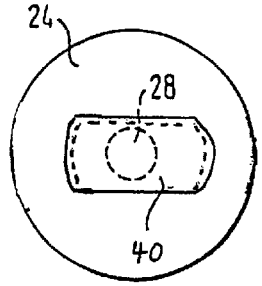
FIG. 8 shows a top view onto the front wall section with fully inflated gas bag according to a fifth embodiment.

According to FIG. 8, the closure piece 40 is attached to the front wall section 24 by a U-shaped seam circumscribing the depression. The open side of the "U" allows to displace the closure piece around the holding piece 18 in the folded state of the gas bag.

What is claimed is:

1. A gas bag module comprising:
    a gas bag with a gas bag wall having a front and a rear wall section, a depression including a mouth and running in an inflated state of said gas bag from said front wall section to said rear wall section, said depression being formed in that a part of said gas bag wall is prevented from an unimpeded movement away from said module on unfolding of said gas bag, and said depression being circumferentially surrounded by a ring-shaped inflatable portion of said gas bag, at least one closure piece moveable relative to said gas bag wall, said closure piece being fastened to one of said gas bag wall and a module housing, and said closure piece moving in front of said mouth of said depression during inflation of said gas bag and, at the end of an inflation process, closing said depression.

2. The gas bag module according to claim 1, wherein said closure piece is a fabric piece sewn to said gas bag wall.

3. The gas bag module according to claim 1, wherein said closure piece has ends and is constructed in a band shape, said closure piece being fastened by said ends to said rear wall section and running across said front wall section.

4. The gas bag module according to claim 3, wherein said gas bag does not have a limiting strap in its interior and wherein said front wall section in said inflated state of said gas bag lies against said closure piece.

5. The gas bag module according to claim 1, wherein said closure piece has free ends as well as a crossing point and is constructed in a cross shape, said closure piece being fastened by said free ends to said rear wall section, and said crossing point closing said depression.

6. The gas bag module according to claim 1, wherein at least two closure pieces are provided.

7. The gas bag module according to claim 6, wherein said two closure pieces are connected with each other, a connection between the closure pieces allowing a relative movement between said closure pieces during unfolding of said gas bag.

8. A gas bag comprising:
    a gas bag with a gas bag wall which has a front and a rear wall section, a depression including a mouth and running in an inflated state of said gas bag from said front wall section to said rear wall section, which depression is formed in that a part of said gas bag wall is prevented from an unimpeded movement away from said module on unfolding of said gas bag,
    at least two closure pieces fastened to one of said gas bag wall and a module housing, said two closure pieces being connected with each other, a connection between said closure pieces allowing a relative movement between said closure pieces, at least one of said closure pieces having at least one leadthrough opening for the other closure piece extending through said leadthrough opening and, during inflation of said gas bag, said closure pieces moving in front of said mouth of said depression and closing said depression.

9. The gas bag module according to claim 8, wherein one closure piece extends through said leadthrough opening and as far as into said depression.

10. The gas bag module according to claim 8 wherein a band-shaped prolongation of one of said closure pieces extends through said leadthrough opening and as far as to a central holding piece to which the one part of the gas bag wall is fastened that is prevented from an unhindered movement towards outside of said module, said band-shaped prolongation likewise being fastened to said holding piece.

11. A gas bag module comprising:
    a gas bag with a gas bag wall which has a front and a rear wall section, a depression including a mouth and running in an inflated state of said gas bag from said front wall section to said rear wall section, which depression is formed in that a part of said gas bag wall is prevented from an unimpeded movement away from said module on unfolding of said gas bag,
    an annular chamber housing said folded gas bag, in said annular chamber a centrally arranged holding piece being provided which delimits said annular chamber on an inner side, said holding piece, in said folded state of said gas bag, extending inside said depression,
    at least one closure piece, said closure piece being fastened to one of said gas bag wall and a module housing, in said folded state of said gas bag said closure piece at least partially laterally surrounding said holding piece, and said closure piece moving during inflation of said gas bag in front of said mouth of said depression and closing said depression.

12. The gas bag module according to claim 11 wherein said gas bag module has a covering for an annular, predefined outlet opening, said covering having a central piece which is connected with said holding piece and is surrounded by said outlet opening and which remains fixed in position on opening of said covering.

13. A gas bag module comprising:
    a gas bag with a gas bag wall which has a front and a rear wall section, a depression including a mouth and running in an inflated state of said gas bag from said front wall section to said rear wall section, which depression is formed in that a part of said gas bag wall is prevented from an unimpeded movement away from said module on unfolding of said gas bag,
    an annular chamber housing said folded gas bag, in said annular chamber a centrally arranged holding piece being provided which delimits said annular chamber on an inner side, said holding piece, in said folded state of said gas bag, extending inside said depression,
    at least one closure piece, said closure piece being fastened to one of said gas bag wall and a module housing, said closure piece having an opening through which in said folded state of said gas bag said holding piece extends, said opening, on unfolding of said gas bag, being displaced outwards along said holding piece, during inflation of said gas bag said closure piece moving in front of said mouth of said depression and closing said depression, and said opening of said closure piece in said inflated state of said gas bag being situated outside said depression.

14. The gas bag module according to claim 13, wherein said gas bag module has a covering for an annular, predefined outlet opening, said covering having a central piece which is connected with said holding piece and is surrounded by said outlet opening and which remains fixed in position on opening of said covering.

* * * * *